(12) United States Patent
Ramakrishnan et al.

(10) Patent No.: US 8,275,622 B2
(45) Date of Patent: Sep. 25, 2012

(54) ULTRASONIC DOPPLER SENSOR FOR SPEAKER RECOGNITION

(75) Inventors: Bhiksha Raj Ramakrishnan, Pittsburgh, PA (US); Kaustubh Kalgaonkar, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 903 days.

(21) Appl. No.: 12/366,787

(22) Filed: Feb. 6, 2009

(65) Prior Publication Data

US 2010/0204991 A1   Aug. 12, 2010

(51) Int. Cl.
*G10L 15/00* (2006.01)
(52) U.S. Cl. ........................................................ 704/270
(58) Field of Classification Search .......... 704/246–250, 704/270, 273
See application file for complete search history.

(56) References Cited

U.S. PATENT DOCUMENTS

| | | | |
|---|---|---|---|
| 7,541,923 B2* | 6/2009 | Chien | 340/541 |
| 2003/0164792 A1* | 9/2003 | Jahangir et al. | 342/90 |
| 2008/0071532 A1 | 3/2008 | Ramakrishnan et al. | |

OTHER PUBLICATIONS

Kalgaonkar et al.; Ultrasonic Doppler sensor for speaker recognition; Acoustics, Speech, and Signal Processing, 2008. ICASSP 2008. IEEE International Conference on; Mar. 31-Apr. 4, 2008. pp. 4865-4868.*

* cited by examiner

*Primary Examiner* — Abul Azad
(74) *Attorney, Agent, or Firm* — Dirk Brinkman; Gene Vinokur

(57) ABSTRACT

A method and system recognizes an unknown speaker by directing an ultrasonic signal at a face of the unknown speaker. A Doppler signal of the ultrasonic signal is acquired after reflection by the face, and Doppler features are extracted from the reflected Doppler signal. The Doppler features are classified using Doppler models storing the Doppler features and identities of known speakers to recognize and identify the unknown speaker.

16 Claims, 2 Drawing Sheets

ULTRASONIC DOPPLER SENSOR FOR SPEAKER RECOGNITION

FIELD OF THE INVENTION

This invention relates generally to speaker recognition, and more particularly to recognizing speaker using a Doppler sensor.

BACKGROUND OF THE INVENTION

The problem of speaker recognition has traditionally been treated as one of speech classification. The speech from the speaker is parameterized into sequences of feature vectors. The sequences of feature vectors are classified as belonging to a particular speaker using some classification mechanism. The prior art has primarily focused either on deriving better descriptive features from the speech signal, and on better classifiers applied to the features.

Speaker recognition can be improved by augmenting measurements from the speech signal with input from other sensors, in particular a camera. A variety of techniques are known for integrating information extracted from the video with that obtained from the speech signal. The most obvious is to combine evidence from a face recognition classifier that operates on the video to evidence from the speaker ID system that works on the speech.

Other techniques have explicitly to derive speaking-related features, such as characterizations of lip configurations, facial texture around the lips [8] etc.

Other secondary sensors, such as a physiological microphone (PMIC) and a glottal electromagnetic micropower sensor (GEMS), provide measurements that augment speech signals. However, they have largely been used for speech recognition, because they primarily produce readings that represent relatively noise-free readings of the some aspects of the speech signal, such as a filtered version of the speech, or the excitation to the vocal tract, and do not provide any additional information about the speaker that is not contained in the speech signal itself. Additionally, many of those devices must be mounted on the speaker, and are not appropriate for use in most speaker recognition or verification applications.

SUMMARY OF THE INVENTION

Embodiments of the invention provide a method and system for recognizing unknown speakers using ultrasonic acoustic Doppler sonar and speech signals. An ultrasonic emitter directs a 40 kHz tone towards an unknown speaker. Reflections from the face of the speaker are recorded as the speaker talks. The frequency of the Doppler signal is modified by the velocity of the facial structures when the signal is reflected by the face.

Thus, the received ultrasonic signal contains an entire spectrum of frequencies representing the set of all velocities of facial articulators. The pattern of frequencies in the reflected signal is observed to be typical of the speaker.

The acquired ultrasonic signal is synchronously analyzed with the corresponding speech signal to extract specific characteristics that can be used to recognize the speaker.

This multi-modal speaker recognition results in significant improvements in speaker recognition accuracy under clean and noise conditions.

DETAILED DESCRIPTION OF THE PREFERRED EMBODIMENT

Figure 1:
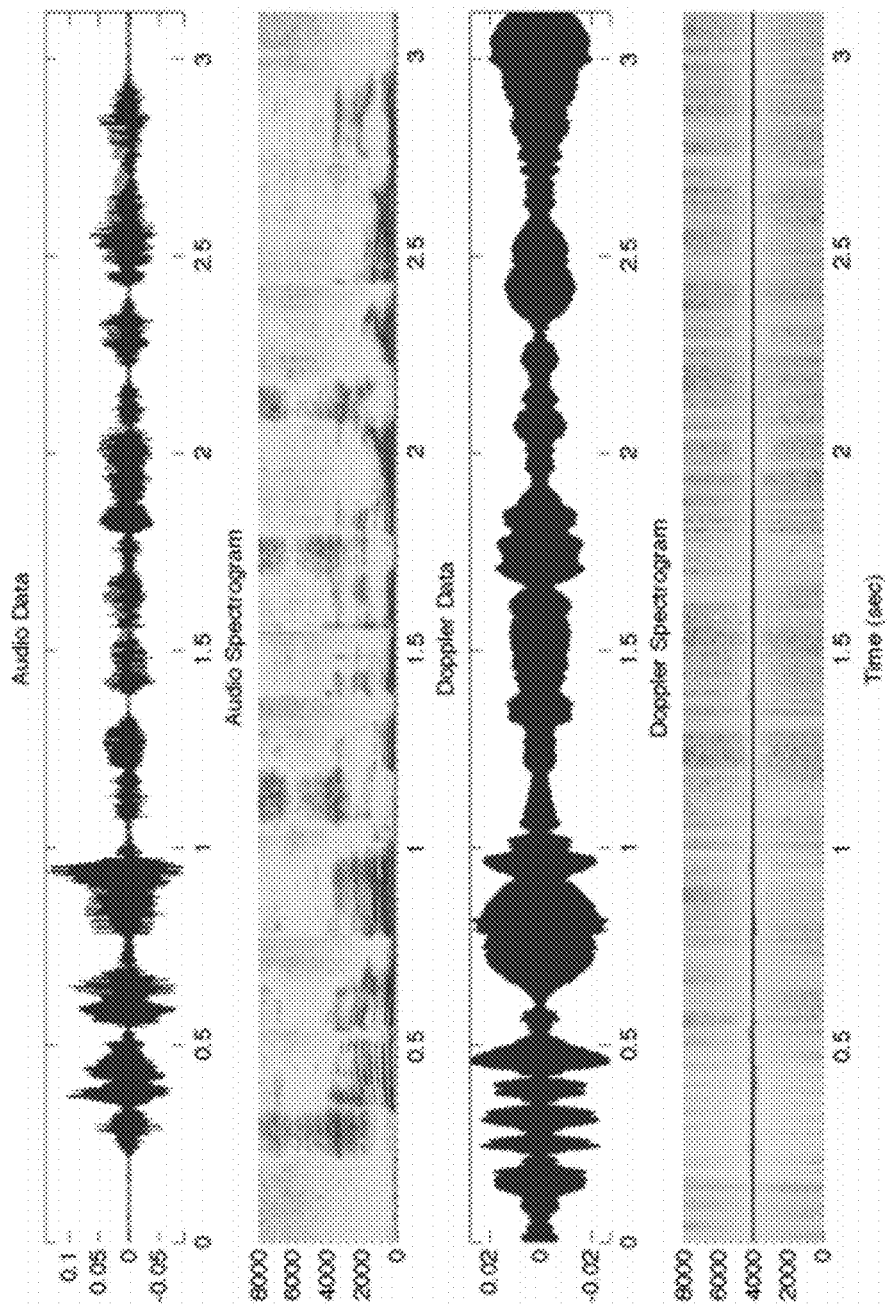
FIG. 1 is a schematic is audio and Doppler data, and corresponding spectrograms used by embodiments of the invention.

For our speaker recognition method, we use an acoustic Doppler sonar augmented microphone. The system comprises an acoustic microphone, an ultrasound receiver, and ultrasound transmitter, and a processor. The signal from the emitter is a 40 kHz tone. The transmitter and receiver have a diameter that is approximately equal to the wavelength of the 40 kHz tone, and thus have a beamwidth of about 60°. The system is direct at a face of a speaker. The complete details of the system are described in U.S. Patent Application 20080071532, "ULTRASONIC DOPPLER SENSOR FOR SPEECH-BASED USER INTERFACE," filed by Ramakrishnan et al. on Mar. 20, 2008, incorporated herein by reference. There, the system is used to detect speech activity of the speaker. We now use the system to recognize the identity of an unknown speaker.

The signals emitted by the 40 kHz transmitter are reflected by the face of the unknown speaker, and acquired by the receiver. As defined herein, a speaker is a person speaking. So when we use the term speaker it can be assumed the speaker is actually speaking.

The receiver also acquires high-frequency harmonics from the speech and any background noise. However, the harmonics are significantly attenuated with respect to the level of the reflected Doppler signal in most conventional operating conditions.

The transmission and acquisition of the Doppler signal can be performed concurrently with that of the acoustic signal by a conventional stereo sound card in the processor. Because the high-frequency receiver tuned and to a bandwidth of only about 4 kHz, the principle of band-pass sampling may be applied, and the signal need not be sampled at more than 12 kHz, although we can sample at rates up to 96 kHz. These operations are also described by Ramakrishnan et al.

Doppler Effect

The Doppler effect states that if a tone of frequency f is incident on an object, i.e., the face in our case, with velocity v relative to the receiver, the frequency $\hat{f}$ of the reflected Doppler signal is $$\hat{f} = \frac{v_s + v}{v_s - v} f \quad (1)$$

where $v_s$ is the speed of sound in a particular medium, e.g., air. If the signal is reflected by multiple objects moving at different velocities then multiple frequencies are sensed at the receiver.

The human face is an articulated object with multiple articulators capable of moving at different velocities. When a person speaks, the articulators, e.g., lips, tongue, jaw cheeks, move with velocities that depend on facial construction and are typical of the speaker.

The ultrasonic signal reflected off the face of a speaker has multiple frequencies each associated with one of the moving articulators. Over time, this reflected signal can be expressed as $$d(t) = \sum_{i=1}^{N} a_i(t)\cos(2\pi f_i(t) + \phi_i) + \Psi_{speaker}, \quad (2)$$

where $f_i$ is the frequency of the reflected signal from the $i^{th}$ articulator, which is dependent on $v_i$ velocity of the articulator. The transmitted ultrasonic frequency is $f_c$, and $\alpha_i(t)$ is a time-varying reflection coefficient that is related to the distance of the articulator from the sensor. An articulator-specific phase correction term is $\phi_i$.

The terms within the summation in Equation 2 represents the sum of a number of frequency modulated signals, where the modulating signals $f_i(t)$ are the velocity functions of the articulators. We do not resolve the individual velocity functions via demodulation.

The term $\Psi_{speaker}$ is speaker dependent and accounts for the baseline reflection from the face. The term represents a zero-order characterization of the bumps and valleys in the face and is not related to motion.

FIG. 1 shows a typical signals acquired by our sensors (receivers). The overall characteristics of the signal is typical for the speaker. The figure shows audio (speech) and Doppler data, and corresponding spectrograms.

Signal Processing

Two separate signals are acquired by our system. The acoustic microphone acquires the speech signal, whereas the ultrasonic receiver acquires the Doppler signal. Both signals are sampled at 96 kHz in stereo. Because the ultrasonic receiver is highly frequency selective, the effective bandwidth of the Doppler signal is less than 8 kHz, centered at 40 kHz. Therefore, we heterodyne the signal from the Doppler channel down by 36 kHz so that the signal is now centered at 4 kHz. Both the speech and Doppler signals are then resampled to 16 kHz. Different signal processing schemes are applied on the Doppler and speech signals as described below.

However, it is understood, that the speaker recognition can also be performed only using the ultrasonic signal as described in greater detail below.

Doppler Signal

The frequency characteristics of the Doppler signal vary slowly, because the articulators that modulate its frequency are relatively slow-moving. To acquire the frequency characteristics of the Doppler signal, we segment the signal into relatively long analysis frames of 40 ms each. Adjacent frames overlap by 75%, such that 100 such frames are obtained every second. Each frame is Hamming windowed, and a 1024-point fast Fourier transform (FFT) performed on the windows produce a 513-point power spectral vector. The power spectrum is logarithmically compressed and a discrete cosine transform (DCT) is applied to the compressed power spectrum. The first 40 DCT coefficents form a 40-dimensional cepstral vector. Each cepstral vector is then augmented by a difference vector as $$\Delta C^d[n] = C^d[n+2] - C^d[n-2] \quad (3)$$
$$c^d[n] = [C^d[n]^T \Delta C^d[n]^T]^T,$$

where $C^d[n]$ represents the cepstral vector of the $n^{th}$ analysis frame, $\Delta C^d[n]$ is the corresponding difference vector, $c^d[n]$ is the augmented 80-dimensional cepstral vector, and T is the transpose operator. The augmented vectors are finally used for classification and speaker recognition.

Speech Signal

The speech signal is parameterized similarly to the Doppler signal, with the exception of the size of the analysis frames. The signal is segmented into frames of 20 ms each. Adjacent frames overlap by 10 ms, resulting in 100 analysis frames per second. The window shifts are selected to have frame-wise synchrony between the Doppler and audio channels. However, this is not essential. The frames are Hamming windowed and analyzed by a 512-point FFT to obtain a 257 point power spectrum. It is conventional in speech recognition to integrate the power spectrum down to a Mel-frequency spectrum. However, we do not obtain any significant advantage by doing that, and therefore omit the integration.

The power spectrum is logarithmically compressed and a DCT computed from the compressed spectrum yields a 40-dimensional cepstral vector. The cepstral vector is augmented by a difference vector that is computed as the component-wise difference of the cepstral vectors from immediately adjacent frames as $$\Delta C^a[n] = C^a[n+1] - C^a[n-1] \quad (4)$$
$$c^a[n] = [C^a[n]^T \Delta C^a[n]^T]^T,$$

where the audio (a) terms here are similar to the Doppler (d) terms in Equation 3.

Classifier

We use a Bayesian classifier for our speaker recognition. For each known speaker, we learn a separate distribution for the feature vectors from each of the two channels (Doppler and speech). For the purpose of modeling these distributions, we assume that the sequence of feature vectors from any channel to be independent and identically distributed (i.i.d.).

Specifically, we assume that the distribution of both speech and Doppler feature vectors for any speaker w is a Gaussian mixture of the form $$P(A|w) = \sum_i c^a_{w,i} \mathcal{N}(A; \mu^a_{w,i}, R^a_{w,i}) \quad (6)$$
$$P(D|w) = \sum_i c^d_{w,i} \mathcal{N}(D; \mu^d_{w,i}, R^d_{w,i}),$$

where A and D represent a random feature vectors derived from the speech and Doppler signals respectively. P(A|w) and P(D|w) represent the distribution of speech and Doppler feature vectors for speaker w, respectively. $\mathcal{N}(X; \mu, R)$ represents the value of a multivariate Gaussian mixture with mean $\mu$ and covariance R at a point X; $\mu^a_{w,i}$, $R^a_{w,i}$ and $c^a_{w,i}$ represent the mean, covariance matrix and mixture weight respectively of the $i^{th}$ Gaussian mixture in the distribution of speech feature vectors for known speaker w, while $\mu^d_{w,i}$, $R^d_{w,i}$ and $c^d_{w,i}$ represent the mean, covariance matrix and mixture weights for the $i^{th}$ Gaussian mixture in the distribution of Doppler features for the speaker. All parameters of all distributions are learned from a small amount of joint Doppler and speech recordings from the known speakers.

Classification is performed using our Bayesian classifier. Let {A D} represent the set of all speech and Doppler feature vectors obtained from recording of a speaker. The unknown speaker is recognized as a known speaker ŵ according to a rule:

$$\hat{w} = \text{argmax}_w P(w) \prod_{A,D \in AD} P(A|w)^\alpha P(D|w)^{1-\alpha}, \quad (7)$$

where P(w) represents the a priori probability of the known speaker w. We assume the probability to be uniform for all speakers. A positive weight term α lies between 0 and 1.0, and represents the confidence we have in the likelihood obtained from the speech measurements. The weight term can be estimated from a held-out test set.

In case only the Doppler signal is used, the rule reduces to $$\hat{w} = \text{argmax}_w P(w) \prod_{D \in D} P(D|w).$$

The function argmax is conventional and stands for the argument of the maximum, that is to say, the value of the given argument for which the value of the given expression attains its maximum value.

Typically, α is varied with the background noise level, i.e., increasing noise can affect the speech signal (or Doppler signal when the noise has very high frequencies and is energetic enough to be acquired by the ultrasonic receiver. Consequently, α varies to increase reliance on the Doppler signal as the relative dependability of the speech signal reduces.

Figure 2:
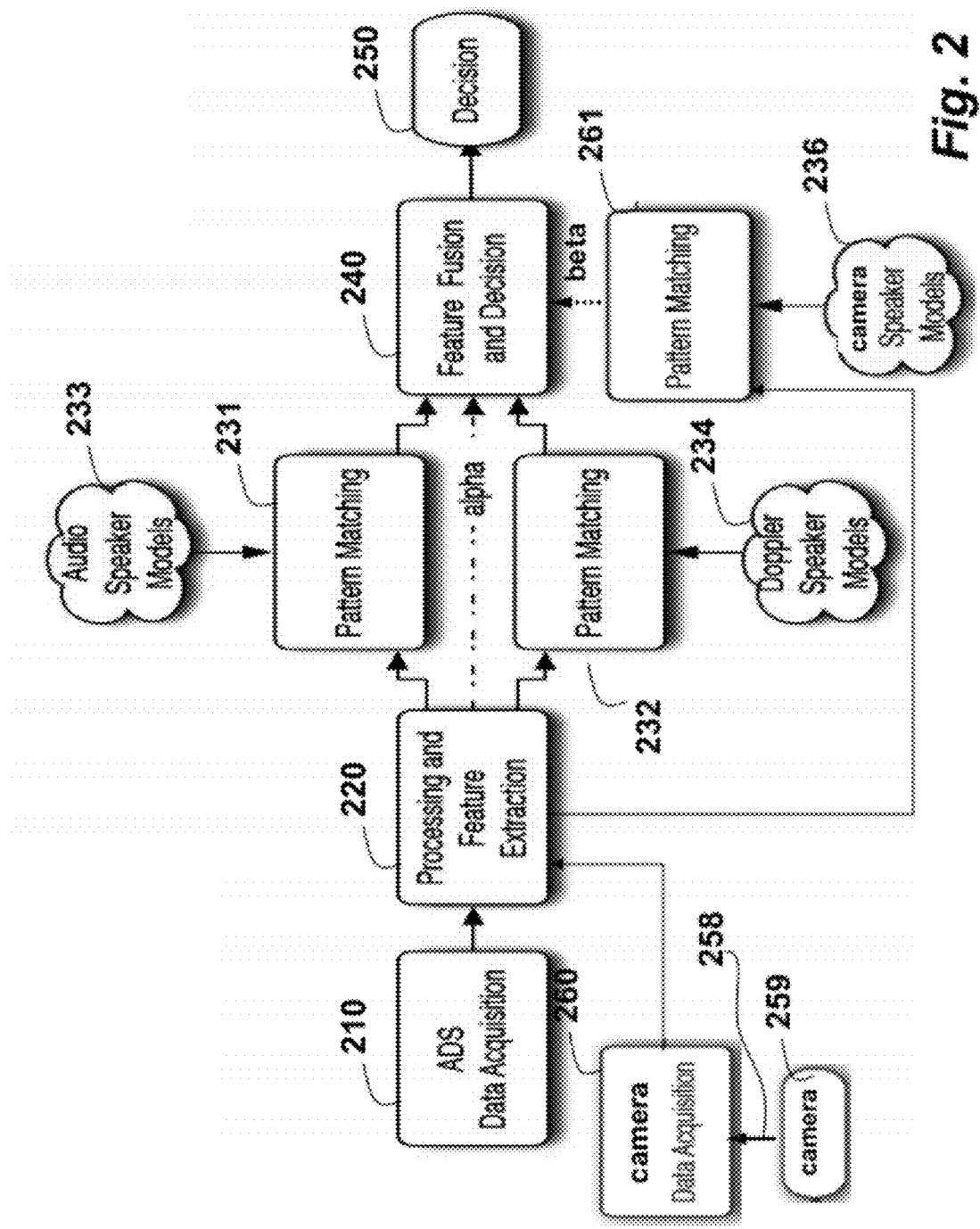
FIG. 2 is a block diagram of a speaker recognition system and method according to embodiments of the invention.

FIG. 2 shows the speaker recognition system and method according to embodiments of our invention using Doppler and speech signals. The figure shows the collocated ultrasonic transmitter, and the Doppler and speech receivers 201.

The audio and Doppler signals (ADS) are acquired as described above. Corresponding audio and Doppler features are extracted. Pattern recognitions 231-232 are applied to the respective features using the corresponding audio and Doppler models 233-234. There is one model for each known speaker. Each model also has an associated identity of the known speaker, The results of the matching are combined (fused) according to the alpha weight a to yield a decision 250 whether of not the unknown speaker is recognized or not.

A generic model can be used to reject the unknown speaker if the unknown speaker is not one of the known speakers.

EFFECT OF THE INVENTION

Table 1 shows the accuracy of our speaker recognition system and method for varied values of clean speech, nonsense speech (babble) and white noise.

TABLE 1

Speaker Recognition Accuracy

| | | Babble | | White | |
|---|---|---|---|---|---|
| α | Clean Speech | 0 dB | 10 dB | 0 dB | 10 dB |
| 0 | 81.63 | 81.63 | 81.63 | 81.63 | 81.63 |
| 0.2 | 99.41 | 51.36 | 80.53 | 51.21 | 72.45 |
| 0.5 | 99.63 | 13.59 | 58.49 | 19.10 | 40.41 |
| 0.8 | 99.34 | 1.84 | 32.99 | 8.30 | 15.36 |
| 1 | 99.19 | 0.22 | 17.34 | 3.97 | 7.71 |

Because the Doppler measurements are secondary measurements that are not affected by audio noise (particularly because the sensitivity of the Doppler sensor to far-field noise is low), the measurements are expected to improve speaker recognition under noisy conditions. To test this hypothesis, we conducted experiments by corrupting the speech signal with babble and white noise to 0 db and 10 dB SNR. In each case, α, the parameter that governs the relative contribution of speech and Doppler to the classification was varied.

Surprisingly, we observe that speaker recognition using just the Doppler signal (α=0) is quite high, at 81.63%. On clean speech, while the speaker recognition performance with speech alone is quite high, augmenting the speech signal with the Doppler at α=0.5 results in further improvement, reducing the error by 54% relative to that obtained with speech alone.

The addition of any noise at all to the speech results in dramatic reduction of performance of speech-only speaker recognition. In all cases, we are simply better off depending only on the Doppler data for speaker recognition in the presence of noise because the Doppler signal itself is not corrupted. Nevertheless, considering the relative insensitivity of the Doppler sensor to noise, in practical noisy applications, the use of secondary Doppler information improves speaker recognition significantly.

The Doppler sonar is an effective secondary sensor that can effectively augment speech signals for greatly improved speaker recognition. The type of information acquired by the sonar is fundamentally different from that in the speech signal itself. Consequently, it is possible to augment the speech signal and improve speaker recognition performance, even in clean conditions. Under noisy conditions, the Doppler information is expected to be of even higher value to the recognizer.

Further, we can combine our method with camera data 260, and corresponding pattern matching 261 with a camera based model 262 that stores visual features and an appropriate weight β, yields even greater improvements. Although the Doppler sonar captures features related to the physiognomy of the speaker just as the camera does, the features captured by it are fundamentally different.

The camera 259 captures a temporal sequence of images 258, such that each image represents a state of an instantaneous pose (position and orientation) of the face. The velocities of various parts of the face are derived by differentiating visual features extracted from the images. The Doppler sensor, on the other hand, acquires captures instantaneous velocities. Thus, the Doppler measurements are orthogonal to those acquired by the camera. In fact, the Doppler sensor is complimentary to the camera.

The Doppler sensor does not have some of the problems associated with cameras because the sensor is active, i.e., the ultrasonic tone is directed at the face and does not require external signal sources such as lights. In contrast, the cameras cannot work in the dark. Because we acquire the movements of the entire face and because reflections from objects farther from the face are typically very attenuated, there is no need to explicitly extract face-related components from the signal.

Nevertheless, the Doppler sensor is susceptible both to reflections from clutter and other generators of signals in the same frequency range. Therefore, we eliminate clutter from the signal prior to the processing 220. Further, variations in the angle of the speakers face affect measurements. The sensed velocities depend on the angle of the face. We can normalize out some of these variations at least through the use of adaptive transformations of the acquired spectra, and through the use of multiple ultrasonic receivers.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for recognizing an unknown speaker, comprising the steps of:
   directing an ultrasonic signal at a face of an unknown speaker;
   acquiring a Doppler signal of the ultrasonic signal after reflection by the face;
   extracting Doppler features from the reflected Doppler signal; and
   classifying the Doppler features using Doppler models storing the Doppler features and identities of known speakers to recognize and identify the unknown speaker, wherein there is one model for each known speaker.

2. The method of claim 1, further comprising:
   acquiring speech signals from the unknown speaker, while acquiring the Doppler signal;
   extracting audio features from the speech signal; and
   classifying the Doppler features and the audio features using the Doppler models and audio models storing the speech features and the identities of the known speakers to recognize and identify the unknown speaker.

3. The method of claim 1, further comprising:
   acquiring visual signals from the unknown speaker, while acquiring the Doppler signal;
   extracting visual features from the visual signal; and
   classifying the visual features and the Doppler features using the Doppler models and visual models storing the visual features and the identities of the known speakers to recognize and identify the unknown speaker.

4. The method of claim 1, further comprising:
   acquiring speech signals from the unknown speaker, while acquiring the Doppler signal;
   extracting audio features from the speech signal;
   acquiring visual signals from the unknown speaker, while acquiring the Doppler signal and the speech signal;
   extracting visual features from the visual signal; and
   classifying the visual features and the Doppler features and the speech features using the Doppler models and visual models storing the visual features and speech models storing the speech features and the identities of the known speakers to recognize and identify the unknown speaker.

5. The method of claim 1, wherein the ultrasonic signal is a 40 kHz tone.

6. The method of claim 2, wherein means for acquiring the Doppler and speech signals are collocated.

7. The method of claim 1, further comprising:
   band-pass sampling the Doppler signal to a bandwidth of 4 KHz.

8. The method of claim 6, wherein the ultrasonic signal has a frequency f and the face is moving with a velocity v relative to the means for acquiring, and a frequency $\hat{f}$ of the Doppler signal is $$\hat{f} = \frac{v_s + v}{v_s - v} f \quad (1)$$

where $v_s$ is a speed of sound in a particular medium.

9. The method of claim 8, wherein the face includes multiple articulators, and each articulator has a particular velocity to produce an associated Doppler signal with a corresponding frequency.

10. The method of claim 9, wherein Doppler signal over time is expressed as $$d(t) = \sum_{i=1}^{N} a_i(t)\cos(2\pi f_i(t) + \phi_i) + \Psi_{speaker}, \quad (2)$$

where $f_i$ is a frequency of the Doppler signal for an $i^{th}$ articulator, which is dependent on a velocity $v_i$ of the $i^t$ articulator, and the frequency of the ultrasonic signal is $f_c$, and $a_i(t)$ is a time-varying reflection coefficient that is related to a distance between the $i^{th}$ articulator and the means for acquiring, and an articulator-specific phase correction term is $\phi_i$, and $\Psi_{speaker}$ is speaker dependent.

11. The method of claim 1, wherein the classifying uses a Bayesian classifier, and wherein each model includes a distribution of the Doppler features of the known speakers.

12. The method of claim 11, wherein the distribution for known speaker w is $$P(D \mid w) = \sum_i c_{w,i}^d \mathcal{N}(D; \mu_{w,i}^d, R_{w,i}^d)$$

where D represent a random feature vectors derived from the Doppler signal, P(D|w) represent the distribution of Doppler feature vectors for speaker w, N(X; μ, R) represents a value of a multivariate Gaussian mixture with mean μ and covariance R at a point X, and $\mu^d_{w,i}$, $R^d_{w,i}$ and $c^d_{w,i}$ represent a mean, covariance matrix and mixture weights for an $i^{th}$ Gaussian mixture in the distribution of the Doppler features for the speaker w.

13. The method of claim 12, wherein the unknown speaker is recognized as known speaker ŵ according a rule:

$$\hat{w} = a r \mathrm{argmax}_w P(w) \prod_{D \in D} P(D \mid w),$$

where P(w) represents an a priori probability of the speaker w.

14. The method of claim 2, wherein contributions of the Doppler and speech features during the classifying are weighted.

15. The methods of claims 1, further comprising:
   rejecting the unknown speaker using a generic model.

16. A system for recognizing an unknown speaker, comprising:
   a transmitter configured to direct an ultrasonic signal at a face of a speaker;
   a receiver configured to acquire a Doppler signal after the ultrasonic signal is reflected by the face;
   means for extracting Doppler features from the reflected Doppler signal; and
   means for classifying the Doppler features using Doppler models storing the Doppler features and identities of known speakers to recognize and identify the unknown speaker, wherein there is one model for each known speaker.

* * * * *